(12) United States Patent
Leonhardt et al.

(10) Patent No.: US 11,490,190 B1
(45) Date of Patent: Nov. 1, 2022

(54) SPEAKER WITH MULTIPLE RESONATORS

(71) Applicant: Apple Inc., Cupertino, CA (US)

(72) Inventors: Oliver Leonhardt, San Francisco, CA (US); Anthony P. Grazian, Mountain View, CA (US); Claudio Notarangelo, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/315,228

(22) Filed: May 7, 2021

(51) Int. Cl.
*H04R 1/28* (2006.01)
*H04R 1/02* (2006.01)
*G06F 1/16* (2006.01)
*H04R 9/04* (2006.01)

(52) U.S. Cl.
CPC ......... *H04R 1/2811* (2013.01); *G06F 1/1688* (2013.01); *H04R 1/025* (2013.01); *H04R 1/2826* (2013.01); *H04R 1/2842* (2013.01); *H04R 1/2849* (2013.01); *H04R 1/2896* (2013.01); *H04R 9/04* (2013.01)

(58) Field of Classification Search
CPC .... H04R 1/025; H04R 1/2811; H04R 1/2826; H04R 1/2842; H04R 1/2849; H04R 1/2869; H04R 1/2873; H04R 1/2896; H04R 9/04; H04M 1/035; G06F 1/1688
See application file for complete search history.

(56) References Cited

U.S. PATENT DOCUMENTS

| | | | |
|---|---|---|---|
| 2,880,817 A | 4/1959 | Burns et al. | |
| 3,819,879 A * | 6/1974 | Baechtold | H04R 1/225 381/353 |
| 4,410,064 A | 10/1983 | Taddeo | |
| 4,777,650 A | 10/1988 | Frederiksen | |
| 4,953,655 A * | 9/1990 | Furukawa | H04R 1/2819 381/349 |
| 5,012,890 A | 5/1991 | Nagle et al. | |
| 5,022,486 A | 6/1991 | Miura et al. | |
| 5,225,639 A | 7/1993 | Kobayashi et al. | |
| 5,261,006 A | 11/1993 | Nieuwendijk et al. | |
| 5,452,268 A | 9/1995 | Bernstein | |
| 5,479,520 A | 12/1995 | Nieuwendijk et al. | |
| 5,514,841 A | 5/1996 | Rochon | |

(Continued)

FOREIGN PATENT DOCUMENTS

| | | |
|---|---|---|
| CN | 1140970 | 1/1997 |
| CN | 1706231 | 12/2005 |

(Continued)

*Primary Examiner* — Huyen D Le

(74) *Attorney, Agent, or Firm* — BakerHostetler

(57) ABSTRACT

Aspects of the subject technology relate to electronic devices having speakers with resonators, such as Helmholtz resonators, acoustically coupled to the front volume of the speaker. A speaker module for an electronic device may include multiple resonators, including a first resonator that is acoustically separate from, and at least partially disposed within a second resonator. An acoustic barrier between the first resonator and the second resonator may have a liquid resistance that is different from a liquid resistance that is provided between the first resonator and a back volume of the speaker module and/or between an external environment of the speaker. In one or more implementations, a third resonator may be provided, that is spatially separated from first and second nested and/or adjacent resonators.

20 Claims, 6 Drawing Sheets

(56) References Cited

U.S. PATENT DOCUMENTS

| | | |
|---|---|---|
| 5,696,357 A | 12/1997 | Starobin |
| 5,710,395 A | 1/1998 | Wilke |
| 5,737,435 A | 4/1998 | De Poortere et al. |
| 6,018,585 A | 1/2000 | Akino |
| 6,130,951 A | 10/2000 | Nakamura et al. |
| 6,188,773 B1 | 2/2001 | Murata et al. |
| 6,278,789 B1 | 8/2001 | Potter |
| 6,356,643 B2 | 3/2002 | Yamagishi et al. |
| 6,668,064 B1 | 12/2003 | Lin |
| 6,751,330 B2 | 6/2004 | Kowaki et al. |
| 7,415,122 B2 | 8/2008 | Soutar |
| 7,433,483 B2 | 10/2008 | Fincham |
| 7,740,104 B1 | 6/2010 | Parkins |
| 7,840,023 B2 | 11/2010 | Eaton |
| 7,869,617 B2 | 1/2011 | Jang et al. |
| 8,213,660 B2 | 7/2012 | Phillips |
| 8,213,666 B2 | 7/2012 | Groesch |
| 8,290,179 B2 | 10/2012 | Gregg et al. |
| 8,325,958 B2 | 12/2012 | Rass |
| 8,494,577 B2 | 7/2013 | Shiogama |
| 9,099,094 B2 | 8/2015 | Burnett |
| 9,107,003 B2 | 8/2015 | Dix et al. |
| 9,317,068 B2 | 4/2016 | Sanders |
| 9,348,371 B2 | 5/2016 | Hoobler |
| 9,408,009 B1 | 8/2016 | Witte et al. |
| 9,469,469 B2 | 10/2016 | Rayner |
| 9,498,032 B2 | 11/2016 | Wu |
| 9,538,272 B2 | 1/2017 | Auclair |
| 9,560,430 B2 | 1/2017 | Iuchi |
| 9,560,435 B2 | 1/2017 | Richardson |
| 9,571,910 B2 | 2/2017 | Lu |
| 9,591,110 B2 | 3/2017 | Hill |
| 9,888,307 B2 | 2/2018 | Vitt et al. |
| 10,299,032 B2 | 5/2019 | Grazian et al. |
| 10,397,693 B1 | 8/2019 | Tao et al. |
| 2003/0059073 A1 | 3/2003 | Bren |
| 2005/0084128 A1 | 4/2005 | Niederdraenk |
| 2008/0095390 A1 | 4/2008 | Gebert |
| 2009/0097669 A1 | 4/2009 | Kamiya |
| 2009/0097679 A1 | 4/2009 | Maeda |
| 2009/0158849 A1 | 6/2009 | Gregg |
| 2010/0040250 A1 | 2/2010 | Gebert |
| 2012/0202559 A1 | 8/2012 | Shiogama |
| 2013/0148834 A1 | 6/2013 | Seo |
| 2013/0271902 A1 | 10/2013 | Lai et al. |
| 2014/0270273 A1 | 9/2014 | Muza |
| 2014/0339012 A1 | 11/2014 | Richardson et al. |
| 2015/0163572 A1 | 6/2015 | Weiss et al. |
| 2015/0172815 A1 | 6/2015 | Park |
| 2016/0080871 A1 | 3/2016 | Zinn |
| 2016/0122177 A1 | 5/2016 | Zinn |
| 2016/0192065 A1 | 6/2016 | Oosato |
| 2017/0164084 A1 | 6/2017 | Vitt |
| 2017/0183218 A1 | 6/2017 | Zinn |
| 2017/0332167 A1 | 11/2017 | Liu |
| 2018/0081406 A1 | 3/2018 | Kita |
| 2020/0045395 A1 | 2/2020 | Wu |
| 2020/0100021 A1* | 3/2020 | Pavlov ................ H04R 1/1075 |

FOREIGN PATENT DOCUMENTS

| | | |
|---|---|---|
| CN | 102934463 | 2/2013 |
| CN | 103200501 | 7/2013 |
| DE | 19601217 | 7/1997 |
| EP | 0360517 | 3/1990 |
| EP | 0429121 | 5/1991 |
| EP | 0744880 | 11/1996 |
| EP | 1685741 | 4/2013 |
| GB | 2408405 | 5/2005 |
| GB | 2463529 | 3/2010 |
| JP | H 08-331685 | 12/1996 |
| JP | 2606447 B | 2/1997 |
| JP | H 09-149487 | 6/1997 |
| JP | H 10-66184 | 3/1998 |
| JP | H 11-259011 | 9/1999 |
| JP | 2000-115898 | 4/2000 |
| JP | 2001-145186 | 5/2001 |
| KR | 2010-0129629 | 12/2010 |
| WO | WO 91/19406 | 12/1991 |
| WO | WO 99/45742 | 9/1999 |

* cited by examiner

SPEAKER WITH MULTIPLE RESONATORS

TECHNICAL FIELD

The present description relates generally to audio transducers for electronic devices, including, for example, speaker with multiple resonators.

BACKGROUND

Electronic devices such as computers, media players, cellular telephones, wearable devices, and headphones are often provided with speakers for generating sound output from the device. However, particularly as devices are implemented in ever smaller form factors, and as user demand for high quality audio increases, it can be challenging to provide speakers that generate high quality sound, particularly in compact devices such as portable electronic devices.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

Figure 1:
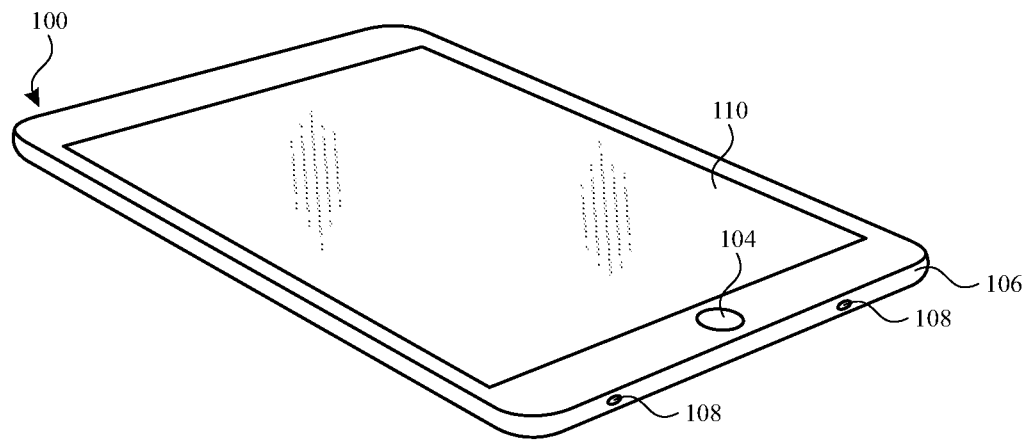
FIG. 1 illustrates a perspective view of an example electronic device having an audio transducer with multiple resonators in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Portable electronic devices such as a mobile phones, portable music players, tablet computers, laptop computers, wearable devices such as smart watches, headphones, earbuds, or other wearable electronic devices, and the like often include one or more audio transducers such as a microphone, or a speaker for generating sound.

However, challenges can arise when constraints for spatial integration with other device components, liquid resistance, and/or other constraints compete with audio quality constraints when attempting to implement an audio transducer module (e.g., a speaker module, or a speaker) in a device. These challenges can be particularly difficult when attempting to implement an audio transducer module into a compact devices such as a portable or a wearable device.

For example, to accommodate spatial constraints, a speaker may be provided with an extended path length from the transducer to a sound outlet port. However, such an extended path length can lead to undesired peaks and/or roll off of the middle and/or high frequency range response of the module.

In accordance with various aspects of the subject disclosure, a speaker module (speaker) may be provided with multiple resonators (e.g., Helmholtz resonators, or HHRs) each having a corresponding frequency. For example, a speaker module may include a first resonator that is acoustically coupled to a front volume of the speaker module that addresses (e.g., reduces an undesired frequency response peak in) a mid-band frequency response (e.g., between about 2 kHz and 4 kHz) of the speaker module. In one or more implementations, the speaker module may also include a second resonator and/or a third resonator that mitigate roll off of the frequency response of the speaker module in a relatively high frequency range (e.g., above about 8 kHz), such as by redistributing and/or attenuating the energy and sound pressure from around 8 kHz to a wider frequency band. In one or more implementations, the speaker module may include first and second resonators that are spatially nested and that have independent entry points on a rear side of the front volume of the speaker module.

In accordance with various aspects of the subject disclosure, a speaker for an electronic device may be provided, the speaker having a flattened response at high frequencies while maintaining fluid resistance for the device. In one or more implementations, first and second resonators (e.g., Helmholtz resonators) are provided that include respective adjacent ports to a front volume of the speaker. A chamber, and a channel between the port and the chamber, for the first resonator may be at least partially embedded or nested in, and acoustically separate from a chamber of the second resonator. A third resonator may also be provided, which may be adjacent to and/or nested within the first and/or second resonators, or which may be spatially separated from the first and second resonators.

An illustrative electronic device including a speaker is shown in FIG. 1. In the example of FIG. 1, device 100 (e.g., an electronic device) has been implemented using a housing that is sufficiently small to be portable and carried by a user (e.g., device 100 of FIG. 1 may be a handheld electronic device such as a tablet computer or a cellular telephone or smart phone). As shown in FIG. 1, device 100 includes a display such as display 110 mounted on the front of housing 106. Device 100 includes one or more input/output devices such as a touch screen incorporated into display 110, a button or switch such as button 104 and/or other input output components disposed on or behind display 110 or on or behind other portions of housing 106. Display 110 and/or housing 106 include one or more openings to accommodate button 104, a speaker, a light source, or a camera.

In the example of FIG. 1, housing 106 includes two openings 108 on a bottom sidewall of housing 106. One or more of openings 108 forms a port for an audio component. For example, one of openings 108 may form a speaker port for a speaker disposed within housing 106 and another one of openings 108 may form a microphone port for a microphone disposed within housing 106. Openings 108 may be open ports or may be completely or partially covered with a permeable membrane or a mesh structure that allows air and sound to pass through the openings. Although two openings 108 are shown in FIG. 1, this is merely illustrative. One opening 108, two openings 108, or more than two openings 108 may be provided on the bottom sidewall (as shown) on another sidewall (e.g., a top, left, or right sidewall), on a rear surface of housing 106 and/or a front surface of housing 106 or display 110. In some implementations, one or more groups of openings 108 in housing 106 may be aligned with a single port of an audio component within housing 106. Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of device 100 of FIG. 1 is merely illustrative. In other implementations, device 100 may be a computer such as a computer that is integrated into a display such as a computer monitor, a laptop computer, a wearable device such as a smart watch, a pendant device, or other wearable or miniature device, a media player, a gaming device, a navigation device, a computer monitor, a television, a headphone, an earbud, or other electronic equipment.

In some implementations, device 100 may be provided in the form of a wearable device such as a smart watch. In one or more implementations, housing 106 may include one or more interfaces for mechanically coupling housing 106 to a strap or other structure for securing housing 106 to a wearer. Device 100 may include one, two, three, or more than three audio components each mounted adjacent to one or more of openings 108.

A speaker disposed within housing 106 transmits sound through at least one associated opening 108. A microphone may also be provided within housing 106 that receives sound through at least one associated opening in the housing 106. In one or more implementations, a speaker module may be mounted such that an output port of the speaker module is mounted adjacent to, and aligned with a corresponding opening 108. The speaker module may include a front volume, a back volume, and multiple resonators, as described in further detail hereinafter.

Figure 2:
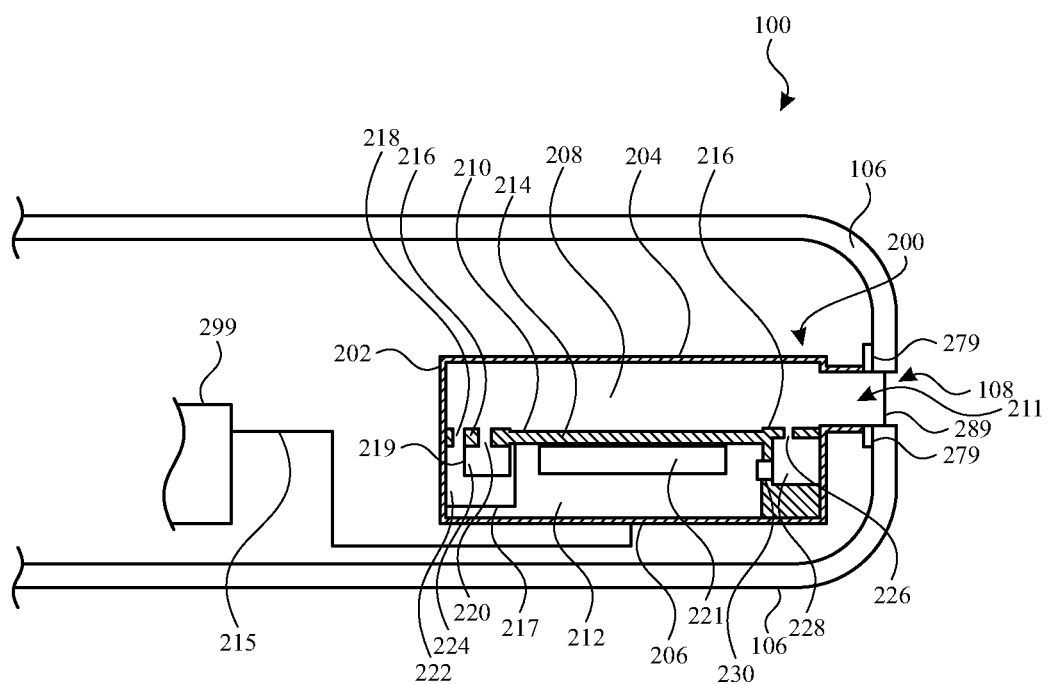
FIG. 2 illustrates a cross-sectional side view of a portion of an example electronic device having an audio transducer module with multiple resonators in accordance with various aspects of the subject technology.

FIG. 2 illustrates a cross-sectional view of a portion of device 100 in which an audio component is mounted. In the example of FIG. 2, device 100 includes speaker module 200. Speaker module 200 includes a housing 202 (e.g., a speaker housing) mounted adjacent at least one opening 108 in housing 106. Housing 202 may be formed form one or more materials such as plastic or metal. As shown, speaker module 200 may include a front volume 208 and a back volume 212 that are separated by a structure 210. The structure 210 may include a diaphragm 214 that actuable to generate sound, and an interior wall 216 that a least partially separates the front volume 208 and the back volume 212.

As shown, speaker module 200 may include an output port 211 that is acoustically coupled to the front volume 208 and aligned with and mounted adjacent to an opening 108, so that sound generated by the diaphragm 214 (e.g., responsive to control signals received from control circuitry such as device circuitry 299) can be transmitted through the opening 108 to the external environment. For example, the output port 211 may be sealed to the opening 108 using a sealing material 279. Opening 108 may be an open port or may include a cover 289 such as a membrane or a mesh structure that discourages entry of debris and/or liquid through the opening 108, but that is permeable to sound and air. In one or more implementations, device 100 may be provided without a cover, or the cover 289 may not prevent liquid entry through the opening 108. As described in further detail hereinafter, the speaker module 200 may be provided with seals (e.g., waterproof or water-resistant seals) at any interface that separates front volume 208 from back volume 212 or the front volume 212 from the internal volume of the device (e.g., a volume within the device housing 106 in which the speaker module 208 is disposed). Circuitry 221 (e.g., including a voice coil for actuating the diaphragm 214 to generate sound) of the speaker module 200 may be coupled to device circuitry such as device circuitry 299 (e.g., one or more processors of the device) via a connector 215. Connector 215 may include a flexible integrated circuit or another flexible or rigid conductive connector.

As illustrated in FIG. 2, the front volume 208 may be bounded in part by a top wall 204 of housing 202 for the speaker module 200, and in part by the interior wall 216 that at least partially separates the front volume 208 from the back volume 212 within the housing. As shown, the back volume 212 may be bounded, in part by the interior wall 216 and a rear wall 206 of the housing 202.

As shown in FIG. 2, the speaker module 200 may include a first port 218 in the interior wall 216 and a second port 220 in the interior wall 216. A first resonator chamber 222 may be acoustically coupled to the front volume 208 via the first port 218 and that may be at least partially bounded by a structure 217 that separates the first resonator chamber 222 from the back volume 212 and/or from the external environment of the speaker module 200. In the example of FIG. 2, the speaker module includes a gap between the structure 217 and the rear wall 206 of the housing 202, the gap fluidly coupled to the back volume 212. However, in other implementations, the first resonator chamber 222 may extend to, and be partially bounded by a portion of the rear wall 206.

The speaker module 200 may also include second resonator chamber 224 that is acoustically coupled to the front volume 208 via the second port 220, and that is acoustically separate from and disposed within the first resonator chamber 222. For example, a structure 219 may acoustically separate the first resonator chamber 222 from the second resonator chamber 224 that is at least partially disposed within the first resonator chamber 222.

For simplicity, the first resonator chamber 222 and the second resonator chamber 224 are shown in FIG. 2 as being directly coupled to the front volume 208 by the respective first port 218 and second port 220. However, as described in further detail herein after, respective first and second channels (also referred to herein as necks) can be provided that extend between the respective first and second ports and the respective first and second resonator chambers. In various implementations, the size (e.g., length, width, height, cross-sectional area, etc.) of the first and second channels can be arranged to provide desired frequency control for sound passing into and/or out of the respective first and second resonator chambers.

In one or more implementations, the structure 217 that separates the first resonator chamber 222 from the back volume 212 acoustically and fluidly separates the first resonant chamber 222 from the back volume 212. For example, the structure 217 may provide a liquid resistant seal (e.g., seal with a waterproof rating of IPX7 or higher, or generally any IPX rating) between the first resonant chamber 222 from the back volume 212. Providing a fluid seal that is liquid resistant between the first resonator chamber 222 and the back volume 212 can help protect the circuitry 221 of the speaker module 200 and/or the device circuitry 299 of the device from liquid damage if, for example, liquid from the external environment enters the front volume 208 and/or the first resonator chamber 222 from the external environment through opening 108 (e.g., if the device 100 is exposed to water or another liquid or is submerged in a liquid such as water).

It is also appreciated that, by nesting the second resonator chamber 224 within the first resonator chamber 222, the structure 217 that separates the second resonator chamber 224 from the first resonator chamber 222 may have a less stringent sealing threshold than the structure 219. For example, the structure 217 can provide an acoustic separation between the second resonator chamber 224 and the first resonator chamber 222, while providing a less liquid resistant seal (e.g., a seal with a waterproof rating of less than IPX7) that can leak liquid into the first resonator chamber 222 from the second resonator chamber 224 in some scenarios. Because the structure 219 provides a liquid resistant seal between the first resonator chamber 222 and the back volume 212, even if liquid were to leak from the second resonator chamber 224 into the first resonator chamber 222, that liquid would still be prevented from leaking into the back volume 212. In this way, the nested arrangement of the acoustically separate first resonator chamber 222 and second resonator chamber 224 can improve the device liquid resistance while simplifying manufacturing processes and requirements.

As shown in FIG. 2, the speaker module 200 may also include a third port 226 in the interior wall 216. A third resonant chamber 228 may be acoustically coupled to the front volume 208 by the third port 226 (e.g., and via a corresponding channel or neck that extends between the third port 226 and the third resonant chamber 228).

In one or more implementations, one or more of the resonator chambers of the speaker module 200 may include a barometric vent that allows passage of air between the resonator chamber and the back volume 212. For example, in FIG. 2, the third resonator chamber 228 is shown with a barometric vent 230 that allows passage of air between the third resonator chamber 228 and the back volume 212, while preventing liquid from passing through the barometric vent 230. However, this is merely illustrative, and the first resonator chamber 222, the second resonator chamber 224, and the third resonator chamber 228 may be free of vents or other fluid couplings to the back volume 212.

In the example of FIG. 2, the first port 218 and the second port 220 for the first resonator chamber 222 and the second resonator chamber 224 are located adjacent to each other in the interior wall 216, and the third port 226 for the third resonator chamber 228 is spatially separated from the first port 218 and the second port 220.

Figure 3:
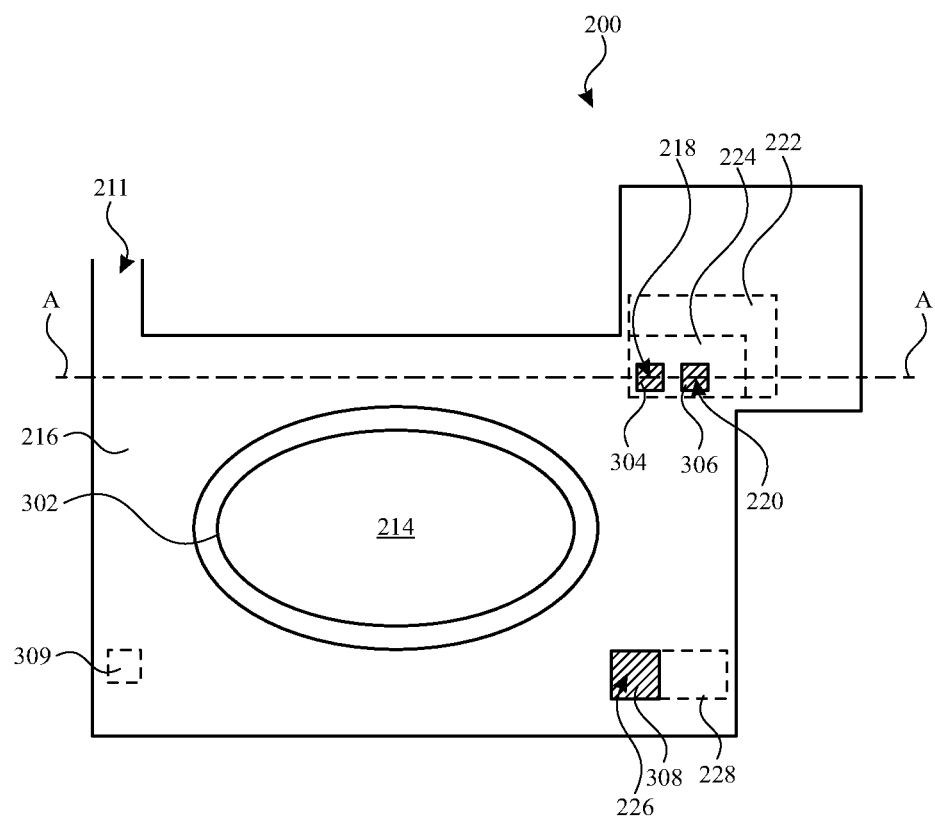
FIG. 3 illustrates a top view of an audio transducer module having multiple resonators, with a top wall of a housing of the module removed in accordance with various aspects of the subject technology.

For example, FIG. 3 illustrates a top view of the speaker module 200 with the top wall 204 removed so that example locations for the first port 218, the second port 220, and the third port 226 can be seen. In the example of FIG. 3, the top surface of the diaphragm 214 is visible and the diaphragm 214 is coupled to the interior wall 216 by a surround 302 that allows the diaphragm 214 to actuate to generate sound in the front volume 208 that passes out of the output port 211. As shown in FIG. 3, the first port 218, the second port 220, and the third port 226 may be located away from the output port 211 (e.g., in regions of the front volume that would experience pressure peaks or maxima in the absence of the ports and respective resonators) for improved acoustic performance (e.g., efficiency of flattening the speaker response at the desired frequencies) of the respective resonators formed by the first resonator chamber 222, the second resonator chamber 224, and the third resonator chamber 228. FIG. 3 also illustrates how the first port 218 and the second port 220 are located adjacent to each other and over the nested first resonator chamber 222 and second resonator chamber 224, and the third port 226 and the third resonator chamber 228 are spatially separate from the first port 218 and the second port 220.

As shown in FIG. 3, the speaker module 200 may include a first acoustic mesh 304 over the first port 218, and a second acoustic mesh 306 over the second port 220. As shown, the first acoustic mesh 304 may be spatially and acoustically separated from the second acoustic mesh 308. In this way, the mesh structure of the first acoustic mesh 304 and the second acoustic mesh 306 may be individually tuned to control (e.g., high frequency) sound input to and/or output from the first resonator chamber 222 and second resonator chamber 224, respectively. In one or more implementations, the speaker module 200 may include a barometric vent 309 that is formed separately from the resonators, and that allows airflow and/or pressure equalization between the front volume 208 and the back volume 212 while preventing fluid from passing through the vent.

Figure 4:
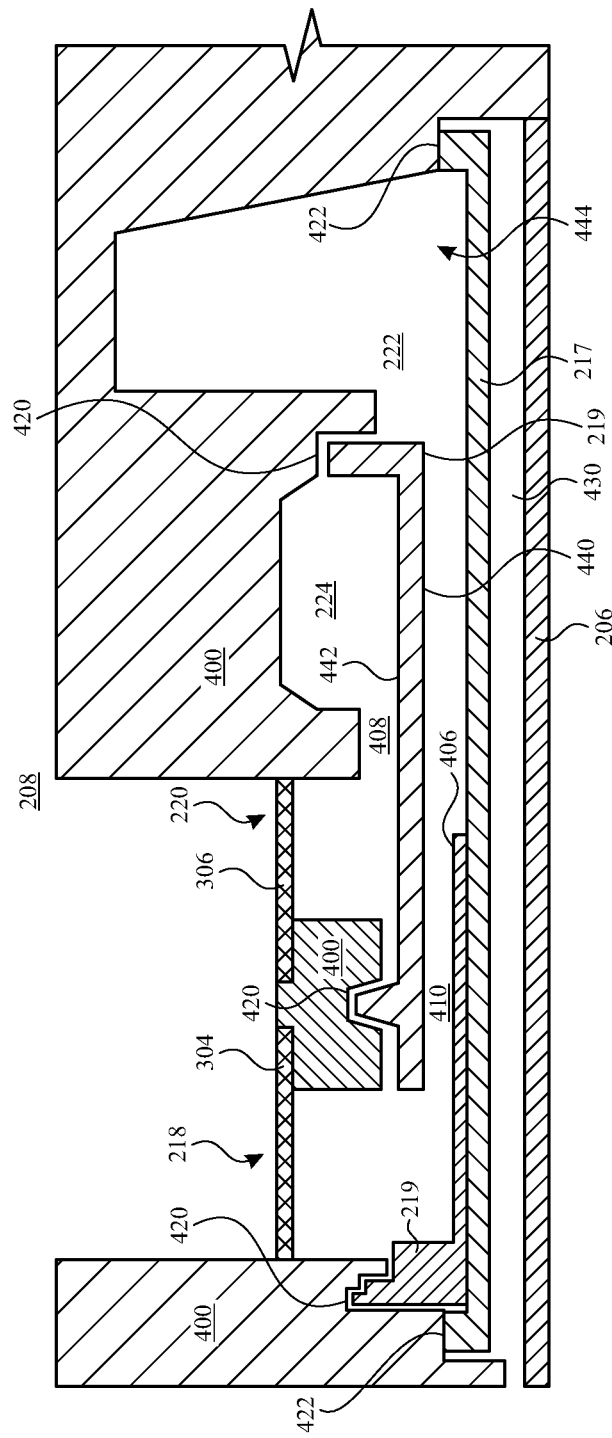
FIG. 4 illustrates a cross-sectional side view of an audio transducer module that includes acoustically separate, spatially nested resonators in accordance with various aspects of the subject technology.

Additional features of the first and second resonators of the speaker module 200 can be seen in the cross-sectional side view of FIG. 4, taken along the line A-A of FIG. 3, in accordance with one or more implementations of the subject technology. As shown in FIG. 4, the speaker module may include a frame 400. A portion of the frame 400 may form, for example, the interior wall 216 of FIGS. 2 and 3.

As shown in FIG. 4, the first acoustic mesh 304 may span an opening in the frame 400 corresponding to the first port 218, and the second acoustic mesh 306 may span an opening in the frame 400 corresponding to the second port 220. FIG. 4 also shows how the speaker module 200 may include a first channel 410 extending between the first port 218 and the first resonator chamber 222, and a second channel 408, acoustically separate (e.g., due to the cover structure 219) from the first channel 410, extending between the second port 220 and the second resonator chamber 224. In this example, the second channel 408 extends parallel to the first channel 410 and through a portion of the first resonator chamber 222 (e.g., through a portion of the same recess 444 that forms the first resonator chamber 222).

As shown in FIG. 4, the cover structure 219 may be a first cover structure that acoustically separates the first resonant chamber 222 from the second resonant chamber 224, acoustically separates the first channel 410 from the second channel 408, and has a first side 440 that defines a portion of the first channel 410 and a second side 442 that defines a portion of the second channel 408. In this example, cover structure 219 is attached (e.g., using an adhesive such as glue, or using another attachment material or mechanism) to a first ledge 420 within a recess 444 in the frame 400 of the speaker module 200.

In this example, the structure 217 that separates the first resonator chamber 222 from the back volume 212 (e.g., including a region 430 between the structure 217 and the rear wall 206) acoustically and fluidly separates the first resonant chamber 222 from the back volume 212. For example, the structure 217 that separates the first resonator chamber 222 from the back volume 212 may form a second cover structure for the first resonant chamber 222. The second cover structure may be attached by a liquid-resistant seal to a second ledge 422 within the recess in the frame of the speaker module (e.g., using a liquid resistant adhesive or other sealing attachment disposed between a protrusion on the structure 217 and the second ledge 422 and forming a seal between the protrusion and the second ledge to a rating of IPX7 or greater). For example, the second ledge 422 may have a width that is wider than a width of the first ledge 420, to allow a more robust liquid-resistant seal between a protrusion on the structure 217 and the second ledge 422 than the acoustic seal between the cover structure 219 and the first ledge 420).

In the example of FIG. 4, cover structure 219 also includes an extension structure 406. As shown, the extension structure 406 extends in parallel to, and is spatially separated from, the first side 440. In this example, the first side 440 of the cover structure 219 defines the portion of the first channel 410 on a first side of the first channel 410, and the extension structure 406 defines a second side of the portion of the first channel 410.

Figure 5:
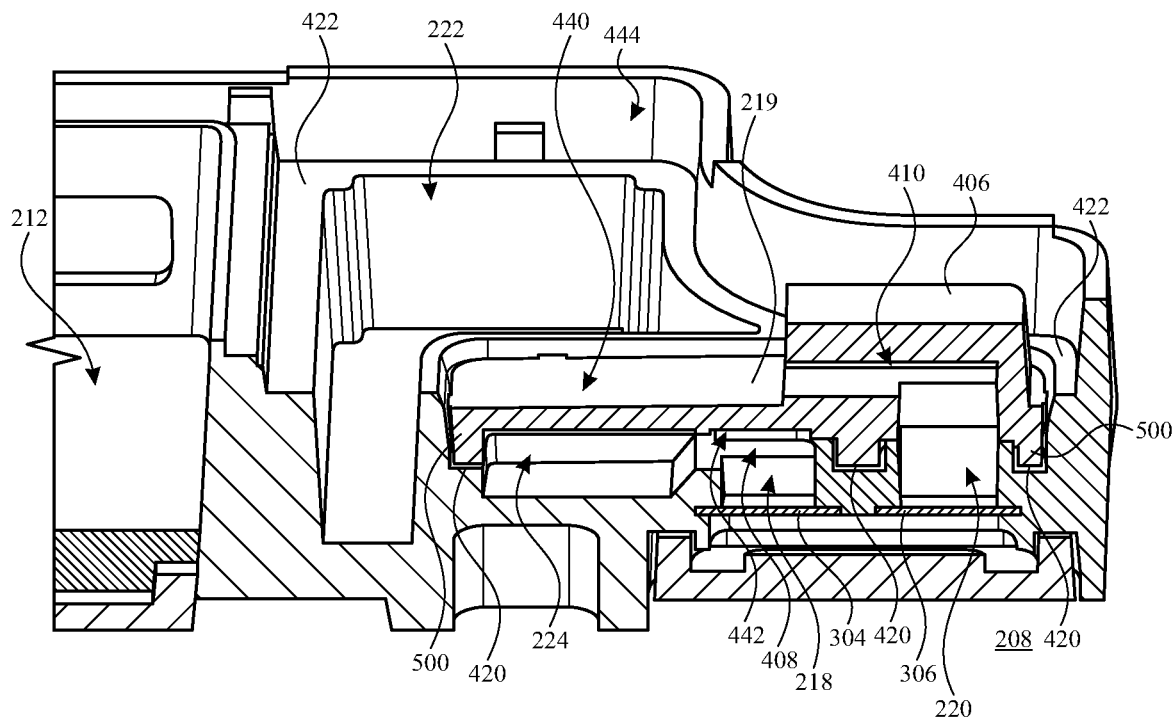
FIG. 5 illustrates a bottom perspective cross-sectional view of a portion of the audio transducer module of FIG. 4 in accordance with various aspects of the subject technology.

FIG. 5 illustrates a bottom perspective view of a portion of the speaker module 200 of FIG. 4, with the cross-section taken along the same line A-A of FIG. 3 and rotated one hundred eighty degrees, relative to FIG. 4, in the plane of the figure. In the example of FIG. 5, the rear wall 206 of the housing 202, and the structure 217 are removed, for clarity. FIG. 5 illustrates aspects of how the speaker module 200 may include a frame 400, a first resonator chamber 222 that is formed in part by a recess 444 in the frame 400, that is acoustically coupled to the front volume 208, and that is fluidly separate from the back volume 212 (e.g., when the structure 217 is sealed to the second ledge 422, such as using a liquid-resistant adhesive, an ultrasonic weld, or another sealing attachment).

The bottom perspective view of FIG. 5 also provides a view of a portion of the second resonator chamber 224 that is acoustically coupled to the front volume 208, and that is acoustically separate from and disposed within the first resonator chamber 222 (e.g., within the recess 444 that also forms the first resonator chamber 222). FIG. 5 also shows additional features of the cover structure 219 for the second resonator chamber 224. As shown, when installed, the cover structure 219 may be disposed within the recess 444 in the frame 400, and may have a first side 440 that defines a first channel 410 between the front volume 208 and the first resonator chamber 222, and a second side 442 that defines a second channel 408 between the front volume 208 and the second resonator chamber 224. As shown in FIG. 5, the cover structure 219 may be attached to the frame 400 within the recess 444 using an acoustic seal (e.g., between the first ledge 420 and one or more protrusion(s) 500 on the structure 219). The acoustic seal between the first ledge 420 and the protrusion(s) 500 may have a liquid resistance that is less than a liquid resistance of the liquid resistant seal for the structure 219 (the liquid-resistant seal between the ledge 422 and one or more protrusions on the structure 217, which is not shown in FIG. 5).

Figure 6:
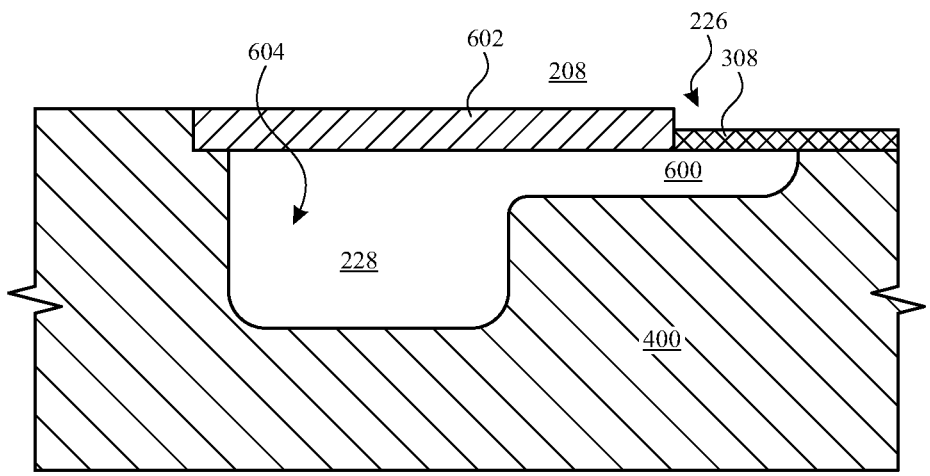
FIG. 6 illustrates a cross-sectional side view of an additional resonator for the audio transducer module in accordance with various aspects of the subject technology.

FIG. 6 illustrates a cross-sectional side view of a portion of the speaker module 200, with the cross-section passing through the third resonator chamber 228 and the third port 226. As shown, the third resonator chamber 228 may be formed by a recess 604 in the frame 400 that does not reach through to the back volume 212 or any other internal volume within the speaker module or the device in which the speaker module may be embedded. For this reason, the third resonator chamber 228 may be provided without a separate cover between the third resonator chamber and the rear volume.

In the example of FIG. 6, the third resonator chamber 228 may be partially bounded by a lid 602 that is disposed between the third resonator chamber 228 and the front volume 208. The lid 602 may, for example, be formed from a metal (e.g., steel, aluminum, or a combination of metals) and may also partially define a channel 600 that extends from the third port 226 to the third resonator chamber 228. In the examples of FIGS. 3 and 6, the third port 226 is covered by an acoustic mesh 308. However, in other implementations, the third port 226 may be provided without an acoustic mesh (e.g., in circumstances in which the size of the third port 226 and/or the size (e.g., cross-sectional area) and/or length of the channel 600 can sufficiently control (e.g., damp) the frequencies of sound entering and/or exiting the third resonator chamber 228.

Figure 7:
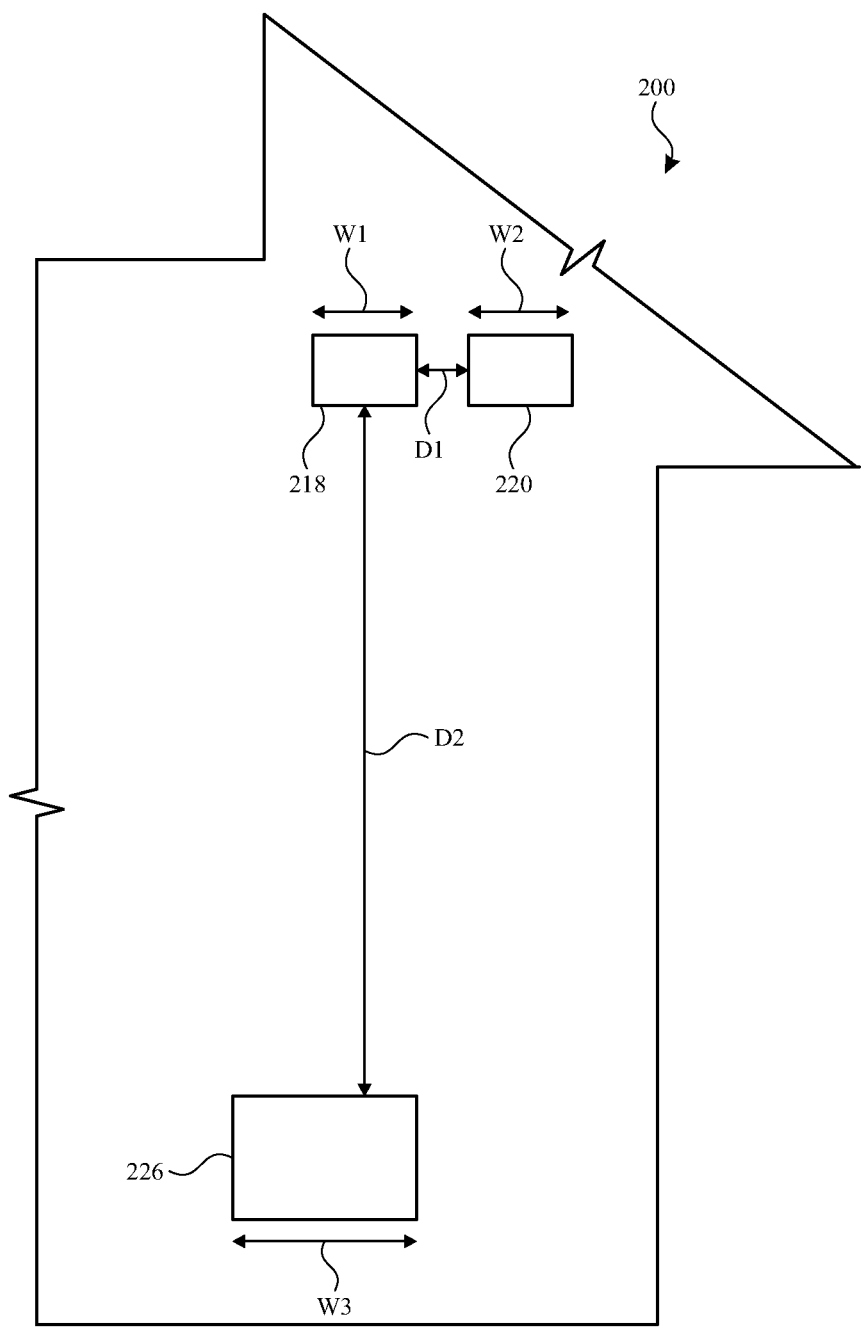
FIG. 7 illustrates a top view of a portion of an audio transducer module having multiple resonators, with a top wall of a housing of the module removed in accordance with various aspects of the subject technology.

FIG. 7 illustrates an enlarged top view of a portion of the speaker module 200 of FIG. 3, in order to illustrate features of the relative positions of the ports for the multiple resonators of the speaker module. As shown in FIG. 7, the first port 218 may have a first width W1, the second port 220 may have a second width W2, and the third port 226 may have a third width W2. In the example of FIG. 6, the first port 218, the second port 220, and the third port 226 are shown without acoustic meshes for clarity.

In the example of FIG. 7, the first port 218 and the second port 220 are spaced apart by a first distance D1 that is substantially less than the width W1 of the first port 218. In this example, the third port 226 and the first port 218 are spaced apart by a second distance D2 that is substantially larger than the width W1 of the first port 218 (and the width W2 of the second port 220 and the width of the third port 226). In the arrangement described herein in connection with FIGS. 2-7, the first resonant chamber 222 and the second resonant chamber 224 are formed within a common recess (e.g., recess 444) in a frame of the speaker module, and the third resonant chamber 228 is formed within a separate recess (e.g., recess 604) in the frame 400 of the speaker module 200. However, it is also appreciated that other arrangements are contemplated in which, for example, the third resonant chamber 228 is acoustically separate from and disposed within the first resonant chamber 222 (e.g., spatially separate from or disposed within the second resonant chamber 224).

Figure 8:
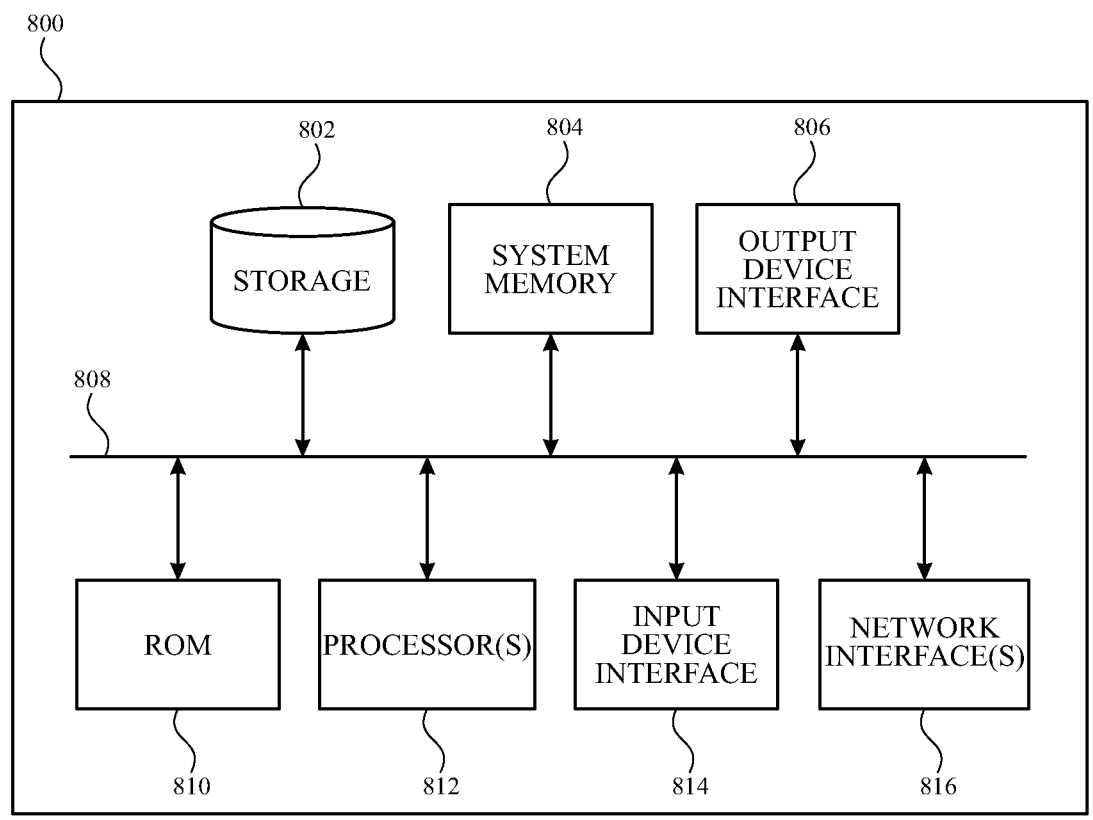
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, one or more of the device 100 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, a speaker or speaker module, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

In accordance with some aspects of the subject disclosure, a speaker is provided that includes a frame; a housing; a front volume bounded in part by a top wall of the housing, and in part by a portion of the frame that at least partially separates the front volume from a back volume within the housing; a first resonator chamber that is formed in part by a recess in the frame, that is acoustically coupled to the front volume, and that is fluidly separate from the back volume; and a second resonator chamber that is acoustically coupled to the front volume, and that is acoustically separate from and disposed within the recess.

In accordance with other aspects of the subject disclosure, a speaker is provided that includes a front volume bounded in part by a top wall of a housing for the speaker, and in part by an interior wall that at least partially separates the front volume from a back volume within the housing; a first port in the interior wall; a second port in the interior wall; a first resonator chamber that is acoustically coupled to the front volume via the first port and that is at least partially bounded by a structure that separates the first resonator chamber from the back volume; and a second resonator chamber that is acoustically coupled to the front volume via the second port, and that is acoustically separate from and disposed within the first resonator chamber.

In accordance with other aspects of the subject disclosure, an electronic device is provided that includes control circuitry; and a speaker communicatively coupled to the control circuitry. The speaker includes a front volume bounded in part by a top wall of a housing for the speaker, and in part by an interior wall that at least partially separates the front volume from a back volume within the housing; a first port in the interior wall; a second port in the interior wall; a first resonator chamber that is acoustically coupled to the front volume via the first port and that is at least partially bounded by a structure that separates the first resonator chamber from the back volume; and a second resonator chamber that is acoustically coupled to the front volume via the second port, and that is acoustically separate from and disposed within the first resonator chamber.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A speaker, comprising:
   a front volume bounded in part by a top wall of a housing for the speaker, and in part by an interior wall that at least partially separates the front volume from a back volume within the housing;
   a first port in the interior wall;
   a second port in the interior wall;
   a first resonator chamber that is acoustically coupled to the front volume via the first port and that is at least partially bounded by a structure that separates the first resonator chamber from the back volume;
   a second resonator chamber that is acoustically coupled to the front volume via the second port and disposed within the first resonator chamber;
   a first channel extending between the first port and the first resonator chamber; and
   a second channel, acoustically separate from the first channel, extending between the second port and the second resonator chamber; and
   a cover structure that acoustically separates i) the first resonant chamber from the second resonant chamber and ii) the first channel from the second channel, the cover structure comprising a first side that defines a portion of the first channel and a second side that defines a portion of the second channel.

2. The speaker of claim 1, wherein the second channel extends parallel to the first channel and through a portion of the first resonator chamber.

3. The speaker of claim 1, wherein the cover structure is attached to a first ledge within a recess in a frame of the speaker.

4. The speaker of claim 3, wherein the structure that separates the first resonator chamber from the back volume acoustically and fluidly separates the first resonant chamber from the back volume.

5. The speaker of claim 4, wherein:
   the cover structure defines a first cover structure,
   the structure that separates the first resonator chamber from the back volume comprises a second cover structure for the first resonant chamber, and
   the second cover structure is attached by a liquid-resistant seal to a second ledge within the recess in the frame.

6. The speaker of claim 5, wherein the second ledge has a width that is wider than a width of the first ledge.

7. The speaker of claim 1, wherein the cover structure further comprises an extension structure, wherein the first side of the cover structure defines the portion of the first channel on the first side of the first channel, and wherein the extension structure defines the second side of the portion of the first channel.

8. The speaker of claim 1, further comprising:
   a first acoustic mesh over the first port; and
   a second acoustic mesh, spatially and acoustically separated from the first acoustic mesh, over the second port.

9. The speaker of claim 1, further comprising:
   a third port in the interior wall; and
   a third resonant chamber coupled to the front volume by the third port.

10. The speaker of claim 9, wherein the first and second ports are spaced apart by a first distance that is substantially less than a width of the first port, and wherein the third port and the second port are spaced apart by a second distance that is substantially larger than the width of the first port.

11. The speaker of claim 10, wherein the first resonant chamber and the second resonant chamber are formed within a common recess in a frame of the speaker, and the third resonant chamber is formed within a separate recess in the frame of the speaker.

12. The speaker of claim 9, wherein the third resonant chamber is acoustically separate from and disposed within the first resonant chamber.

13. A speaker, comprising:
a frame;
a housing;
a front volume bounded in part by a top wall of the housing, and in part by a portion of the frame that at least partially separates the front volume from a back volume within the housing;
a first resonator chamber that is formed in part by a recess in the frame, that is acoustically coupled to the front volume, and that is fluidly separate from the back volume;
a second resonator chamber that is acoustically coupled to the front volume, and that is acoustically separate from and disposed within the recess; and
a first cover for the first resonator chamber, the first cover attached to the frame within the recess using a liquid resistant seal.

14. The speaker of claim 13, further comprising a second cover for the second resonator chamber, the second cover disposed within the recess in the frame and having a first side that defines a first channel between the front volume and the first resonator chamber, and a second side that defines a second channel between the front volume and the second resonator chamber.

15. The speaker of claim 14, wherein the second cover is attached to the frame within the recess using an acoustic seal having a liquid resistance that is less than a liquid resistance of the liquid resistant seal for the first cover.

16. An electronic device, comprising:
control circuitry; and
a speaker communicatively coupled to the control circuitry, the speaker comprising:
a front volume bounded in part by a top wall of a housing for the speaker, and in part by an interior wall that at least partially separates the front volume from a back volume within the housing;
a first port in the interior wall;
a second port in the interior wall;
a first resonator chamber that is acoustically coupled to the front volume via the first port and that is at least partially bounded by a structure that separates the first resonator chamber from the back volume;
a second resonator chamber that is acoustically coupled to the front volume via the second port, and that is acoustically separate from and disposed within the first resonator chamber;
a first acoustic mesh over the first port; and
a second acoustic mesh, spatially and acoustically separated from the first acoustic mesh, over the second port.

17. The electronic device of claim 16, further comprising a device housing having an opening, wherein the speaker further comprises an output port from the front volume, and wherein the output port of the speaker is aligned with the opening in the device housing.

18. The electronic device of claim 16, further comprising:
a first channel extending between the first port and the first resonator chamber; and
a second channel, acoustically separate from the first channel, extending between the second port and the second resonator chamber.

19. The electronic device of claim 18, further comprising a cover structure that acoustically separates i) the first resonant chamber from the second resonant chamber and ii) the first channel from the second channel, the cover structure comprising a first side that defines a portion of the first channel and a second side that defines a portion of the second channel.

20. The electronic device of claim 19, wherein the cover structure is attached to a first ledge within a recess in a frame of the speaker.

* * * * *

UNITED STATES PATENT AND TRADEMARK OFFICE
CERTIFICATE OF CORRECTION

PATENT NO. : 11,490,190 B1
APPLICATION NO. : 17/315228
DATED : November 1, 2022
INVENTOR(S) : Oliver Leonhardt et al.

It is certified that error appears in the above-identified patent and that said Letters Patent is hereby corrected as shown below:

In the Specification

Column 5, Lines 6-7: "first resonant chamber 222", should read: --first resonator chamber 222--;

Column 5, Line 10: "first resonant chamber 222", should read: --first resonator chamber 222--;

Column 5, Lines 43-44: "third resonant chamber 228", should read: --third resonator chamber 228--;

Column 5, Line 47: "third resonant chamber 228", should read: --third resonator chamber 228--;

Column 6, Lines 61-62: "first resonant chamber 222", should read: --first resonator chamber 222--;

Column 6, Line 62: "second resonant chamber 224", should read: --second resonator chamber 224--;

Column 7, Lines 7-8: "first resonant chamber 222", should read: --first resonator chamber 222--;

Column 7, Line 11: "first resonant chamber 222", should read: --first resonator chamber 222--;

Column 8, Line 47: "first resonant chamber 222", should read: --first resonator chamber 222--;

Column 8, Line 50: "third resonant chamber 228", should read: --third resonator chamber 228--;

Column 8, Line 54: "third resonant chamber 228", should read: --third resonator chamber 228--;

Column 8, Line 55: "first resonant chamber 222", should read: --first resonator chamber 222--;

Column 8, Line 48: "second resonant chamber 224", should read: --second resonator chamber 224--;

Column 8, Lines 56-57: "second resonant chamber 224", should read: --second resonator chamber 224--;

Signed and Sealed this
Fifth Day of December, 2023

*Katherine Kelly Vidal*
*Director of the United States Patent and Trademark Office*

CERTIFICATE OF CORRECTION (continued)
U.S. Pat. No. 11,490,190 B1

In the Claims

Column 14, Lines 29-30 (Claim 1): "the first resonant chamber", should read: --the first resonator chamber--;

Column 14, Line 30 (Claim 1): "the second resonant chamber", should read: --the second resonator chamber--;

Column 14, Line 43 (Claim 4): "the first resonant chamber", should read: --the first resonator chamber--;

Column 14, Line 49 (Claim 5): "the first resonant chamber", should read: --the first resonator chamber--;

Column 14, Line 66 (Claim 9): "a third resonant chamber", should read: --a third resonator chamber--;

Column 15, Lines 6-7 (Claim 11): "the first resonant chamber", should read: --the first resonator chamber--;

Column 15, Line 7 (Claim 11): "the second resonant chamber", should read: --the second resonator chamber--;

Column 15, Lines 8-9 (Claim 11): "the third resonant chamber", should read: --the third resonator chamber--;

Column 15, Lines 11-12 (Claim 12): "the third resonant chamber", should read: --the third resonator chamber--;

Column 15, Line 13 (Claim 12): "the first resonant chamber", should read: --the first resonator chamber--;

Column 16, Lines 33-34 (Claim 19): "the first resonant chamber", should read: --the first resonator chamber--;

Column 16, Line 34 (Claim 19): "the second resonant chamber", should read: --the second resonator chamber--.